United States Patent [19]

Dengler et al.

[11] 4,002,619
[45] Jan. 11, 1977

[54] COUMARINE DYESTUFFS OF THE DISPERSION SERIES

[75] Inventors: Siegfried Dengler, Choex; Peter Loew, Munchenstein; Christian Zickendraht, Binningen; Hansrudolf Schwander, Riehen, all of Switzerland

[73] Assignee: Ciba-Geigy Corporation, Ardsley, N.Y.

[22] Filed: June 17, 1974

[21] Appl. No.: 479,919

[30] Foreign Application Priority Data

June 29, 1973 Switzerland .................... 9504/73

[52] U.S. Cl. ............... 260/240 G; 260/37 R; 260/37 N; 260/40 R; 260/42.21; 260/256.4 Q; 260/293.58; 260/304 R; 260/307 D; 260/309.2

[51] Int. Cl.² ............. C07D 405/00; C07D 413/00

[58] Field of Search ...... 260/307 D, 293.58, 240 G

[56] References Cited

UNITED STATES PATENTS

| | | | |
|---|---|---|---|
| 3,501,490 | 3/1970 | Maeder et al. ............... | 260/307 |
| 3,539,583 | 11/1970 | Voltz et al. ............... | 260/299 |

*Primary Examiner*—Richard J. Gallagher
*Attorney, Agent, or Firm*—Joseph G. Kolodny; Edward McC. Roberts; Prabodh I. Almaula

[57] ABSTRACT

Dyestuffs of the formula

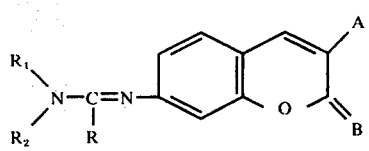

wherein R, $R_1$, and $R_2$ represent optionally substituted alkyl groups that can be interrupted by heteroatoms, and also represent cycloalkyl, aralkyl, aryl, or heterocyclic radicals, R and $R_1$ can also be hydrogen atoms, $R_1$ and $R_2$, together with the nitrogen atom, are able to form a 5-membered or 6-membered ring, R and $R_2$ are able to combine to form a nitrogen-containing heterocycle, B is =O or =NH, and A represents a heterocycle. The new dyestuffs dye synthetic fibers, especially polyester fibers, in greenish yellow shades.

3 Claims, No Drawings

COUMARINE DYESTUFFS OF THE DISPERSION SERIES

The present invention provides dyestuffs of the formula

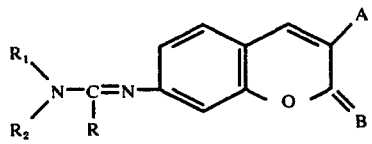

wherein R, $R_1$, and $R_2$ represent optionally substituted alkyl groups that can be interrupted by heteroatoms, and also represent cycloalkyl, aralkyl, aryl, or heterocyclic radicals, R and $R_1$ can also be hydrogen atoms, $R_1$ and $R_2$, together with the nitrogen atom, can form a 5-membered or 6-membered ring, R and $R_2$ can combine to form a nitrogen-containing heterocycle, B represents =O or =NH, and A represents an optionally substituted pyrazole, imidazole, thiazole, oxazole, 1,2,4-triazole, 1,3,4-oxadiazole, 1,3,4-thiadiazole, quinoxalone, benzimidazole, benzthiazole, benzoxazole, pyridine, quinoline, or pyrimidine ring that, in the adjacent position to a nitrogen atom, is attached to the coumarin imide radical, and, when B is =NH, also represents a radical of the formula

wherein Y represents —O—, —S—, or —CH=CH— and $R_3$ represents a hydrogen, chlorine, or bromine atom, a cyano, nitro, lower alkyl carbonyl, lower alkylcarbamoyl and carbamoyl group.

The new dyestuffs are obtained by treating an an amidinium compound of the formula

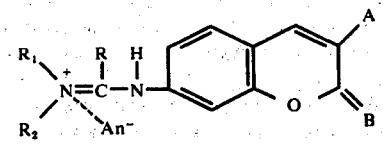

wherein An represents an anion, with alkaline agents.

The new dyestuffs ordinarily contain no acid, water-solubilising groups, e.g. sulphonic acid groups, and belong preferably to the series of disperse dyestuffs.

Possible radicals R, $R_1$, and $R_2$ are alkyl radicals that can be the same or different, e.g. methyl, ethyl, propyl, butyl, pentyl, hexyl, heptyl, octyl, nonyl, or decyl radicals substituted alkyl radicals, e.g. β-chloroethyl, β-hydroxyethyl, β-cyanoethyl, γ-cyanopropyl, β-methoxyethyl, β-acetoxyethyl, β-butyryloxyethyl, methoxycarbonylethyl, ethoxycarbonylethyl, radicals, also phenylethyl or benzyl radicals, aryl radicals, e.g. phenyl, or phenyl radicals that are substituted in ortho-, meta- or para-position by methyl, ethyl, propyl, methoxy, ethoxy and/or cyano, chlorine, bromine, nitro, acetylamino. Radicals $R_1$ and $R_2$ attached to ach other form e.g. the piperidine, morpholine, or acetylpiperazine ring.

If the radicals R and $R_2$ are linked together to form a nitrogen-containing heterocycle, the group —N=CR—$NR_1R_2$ has the formula

wherein $R_4$ represents a divalent organic group that completes the ring to form a heterocycle with 5 to 7 ring atoms, and $R_1$ represents a hydrogen atom or an optionally substituted alkyl group, the ring completing a heterocycle of the formula

e.g. the N-methylpyrrolidone radical or the N-alkylcaprolactam radical, in which formula $R_1$ represents a hydrogen atom, a lower alkyl, or a phenyl-lower alkyl radical.

Throughout this specification, lower alkyl and lower alkoxy radicals are radicals with 1 to 4 carbon atoms. Unless stated to the contrary, they represent the preferred form of the alkyl and alkoxy groups.

The radical R can have the following values:

H, —$CH_3$,
—$C_2H_5$, —$C_3H_7$, —$C_4H_9$, —$C_5H_{11}$, —$C_{17}H_{35}$, NC—$CH_2$—, $CH_3$—O—$CH_2$—,
$C_2H_5$—O—$CH_2$—, $CH_3$—O—$C_2H_4$—, —$CF_3$, $C_2H_5$OOC—$CH_2$—$CH_2$—, NC—$CH_2$—$CH_2$—,
$CH_2$=CH—, $CH_3$—CH=CH—, $CH_2$=C($CH_3$)—, $(C_2H_5)_2$CH—,
$CH_3$—CO—$CH_2$—, $C_6H_5$—$CH_2$— $C_6H_5$—O—$CH_2$—,

[structures: cyclohexyl-CH—, phenyl—, Cl-phenyl—, Cl-phenyl(Cl)—, Br-phenyl—,

F-phenyl—, $CF_3$-phenyl—, $H_3C$-phenyl—, $H_3C$—O-phenyl—, $C_2H_5$—O-phenyl—, $H_3C$—O—$C_2H_4$—O-phenyl—, $H_3$COOC—$CH_2$—O-phenyl—, $H_3C$—OOC—$CH_2$-phenyl—, $C_2H_5$OOC-phenyl—, $H_3$CO—$O_2S$-phenyl—,]

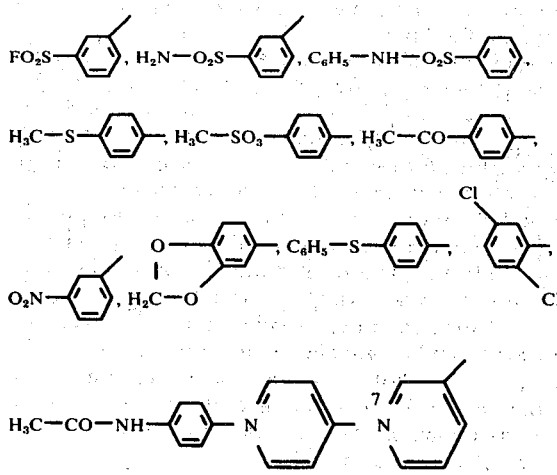

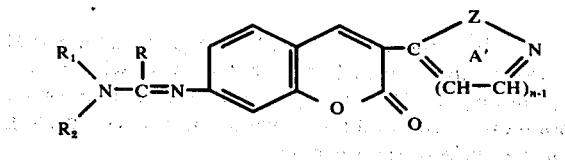

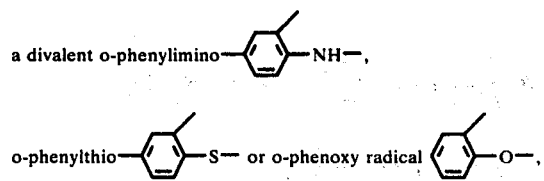

Preferred dyestuufs are dyestuffs of sparing solubility in water and containing no water-solubilising groups that exhibit acid dissociation in water, of the formula

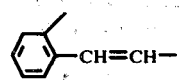

wherein R, $R_1$, and $R_2$ have the same meanings as given hereinbefore, Z represents a divalent radical that completes to the nitrogen-containing ring A' to form a 5-membered or 6-membered ring of aromatic character, n is 1 or 2, and $R_1$ and $R_2$, each independently of the other, preferably represent an optionally substituted alkyl group or a cycloalkyl group, or $R_1$ and $R_2$, together with the nitrogen atom, and optionally with the inclusion of a further heteroatom, are able to form a heterocyclic ring.

If the ring A is a nitrogen-containing 5-membered or 6-membered ring, it is either an azole or an azine ring that is optionally condensed with carbocyclic aromatic rings, for example with the naphthalene ring or, preferably, with the benzene ring.

If the heterocycle A is an azole ring, Z is, for example, the vinylamino radical —CH=CH—NH—, the vinylthio radical —CH=CH—S—, the vinyloxy radical —CH=CH—O— or the radicals —CH=N—NH—, —N=CH—O—, —N=CH—S—, if n is 1. When Z has these meanings, it completes a pyrazole or imidazole, thiazole, quinoxalone, oxazole, 1,2,4-triazole, 1,3,4-oxdiazole, and 1,3,4-thiadiazole ring. If X represents, for example, a divalent o-phenylimino— (ring) —NH—, o-phenylthio— (ring) —S— or o-phenoxy radical (ring) —O—, the heterocyclic ring is accordingly a benzimidazole, benzthiazole, and benzoxazole ring.

If the nitrogen-containing heterocycle A is an azine ring, then the compltive radical Z represents e.g. the butadienylene —CH=CH—CH=CH—, the styrylene radical (ring)—CH=CH— bonded in ortho-position to the vinylene group, or the divalent propyleneimino radical —CH=CH—CH=N—, if n is 1. If n is 2, then Z represents e.g. the vinylene or o-phenylene radical. When Z has these meanings, Z completes in the first instance (n = 1) a pyridine, quinoline, or pyrimidine ring bonded in 2-position to the coumarin radical, and in the second instance (n = 2) a pyridine or quinoline ring bonded in 4-position.

The aromatic fused rings can be further substituted, but on the other hand there must be no water-solubilising groups that exhibit acid dissociation in water present. Examples of suitable ring substituents are halogens, e.g. chlorine or bromine, lower unsubstituted alkyl groups or alkyl groups that are substituted by hydroxyl groups, lower alkoxy groups or by halogens, such as fluorine, chlorine, or bromine, also lower alkoxy groups, e.g. methoxy or ethoxy groups, carbacyl groups, in particular lower alkanoyl groups, such as the acetyl group, lower alkylsulphonyl groups, such as the methylsulphonyl or ethylsulphonyl group, sulphonic acid aryl ester groups, such as the sulphonic acid phenyl ester group, carboxy ester groups, in particular lower carbalkoxy groups, such as the carbomethoxy or carboethoxy group, or the carbophenoxy group, the unsubstituted carboxy amide or sulphoamide group or the N-monosubstituted or N,N-disubstituted carbamyl or sulphamyl groups, especially the N-alkylsulphonamide or N,N-dialkylsulphonamide groups, acylamino groups, e.g. lower alkanoylamino radicals, such as the acetylamino radical, alkylsulphonylamino radicals, such as the methylsulphonylamino radical.

Preferably Z represents a divalent radical that completes the nitrogen-containing ring A' to form an azole ring that is condensed with carbocyclic aromatic rings, in particular a benzazole ring.

Dyestuffs of this kind are those of the formula

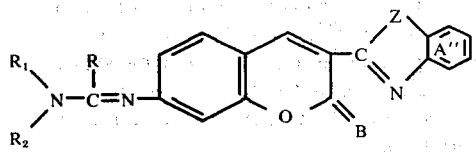

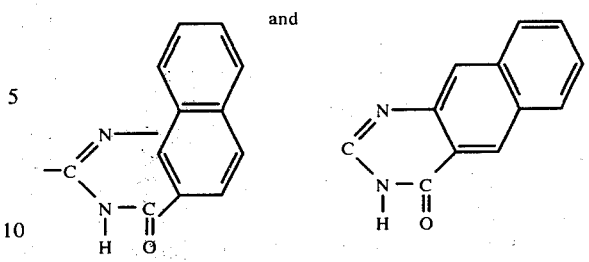

The new dyestuffs are suitable for dyeing semisynthetic and synthetic fibres, for example acrylic or acrylonitrile fibres, polyacrylonitrile fibres and co-polymers of acrylonitrile and other vinyl compounds, such as acrylic esters, acrylic amides, vinyl pyridine, vinyl chloride or vinylidene chloride, co-polymers of dicyanoethylene and vinyl acetate, and of acrylonitrile block co-polymers, fibres of polyurethane, polyolefines, such as basically modified polypropylene, polypropylene modified with nickel or unmodified polypropylene, cellulose triacetate and cellulose 2½-acetate, and especially fibres of polyamides, such as nylon-6, nylon-6,6 or nylon-12, and of aromatic polyesters, such as those from terephthalic acid and ethylene glycol or 1,4-dimethylcyclohexane and co-polymers of terephthalic acid and isoterephthalic acid with ethylene glycol.

wherein Z represents a sulphur atom, an oxygen atom, a —NH group, a —NH—CO group, or a —N(lower alkyl) group, A″ can be substituted by halogen atoms, lower unsubstituted alkyl groups or alkyl groups that are substituted by hydroxyl groups, lower alkoxy groups or be halogens, such as fluorine, chlorine, or bromine, also by lower alkoxy groups, carbacyl groups, lower alkylsulphonyl groups, sulphonic acid aryl ester groups, carboxy ester groups, unsubstituted, N-monosubstituted and N,N-disubstituted aminocarbonyl and aminosulphonyl groups and acylamino groups. These dyestuffs are obtained by treating the amidinium compounds of the formula

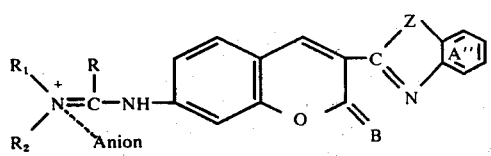

with alkalies.

In compounds that are particularly readily accessible, A is a benzimidazole ring. This ring is in 2-position to the coumarine radical and as described hereinbefore, can be further substituted.

Particularly valuable dyestuffs are those in which A represents a radical of the formulae

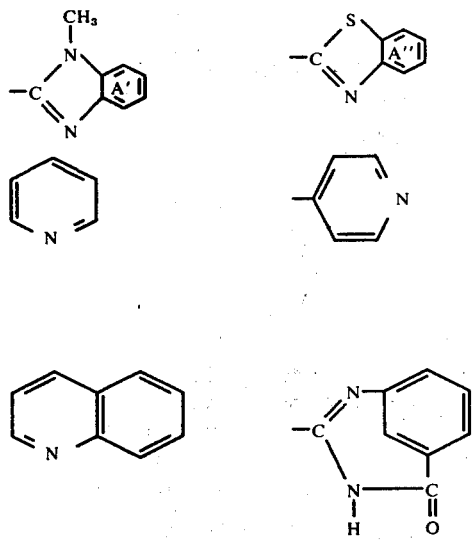

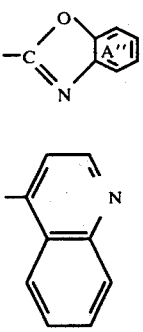

wherein A″ can be substituted by chlorine atoms, bromine atoms, lower alkyl, lower alkoxy, nitro, thiocyano, lower alkylsulphonyl or acetyl groups, and is The dyeing of the above mentioned fibre materials with the dyestuffs according to the invention that are sparingly soluble in water, is carried out preferably from aqueous dispersions. The dyestuffs of the invention can also be applied from a solvent liquor. It is expedient, therefore, to finely divide the representatives suitable for use as disperse dyestuffs by grinding them with textile assistants, for example dispersants, and possibly with other grinding assistants. By subsequent drying, dyestuff preparations are obtained consisting of textile assistant and the dyestuff.

Examples of dispersants of the non-ionic groups that can be used with advantage are: addition products of 8 mols of ethylene oxide with 1 mol of p-tert.-octylphenol, of 15 resp. 6 mols of ethylene oxide with castor oil, of 20 mols of ethylene oxide with the alcohol $C_{16}H_{33}OH$, ethylene oxide addition products with di-[α-phenylethyl]-phenols, polyethylene oxide-tert.-dodecyl-thioether, polyamine-polyglycol ether or addition products of 15 or 30 mols of ethylene oxide with 1 mol of the amino $C_{12}H_{25}NH_2$ or $C_{18}H_{37}NH_2$.

As anionic dispersants there may be mentioned: sulphuric acid esters of alcohols of the fatty series having 8 to 20 carbon atoms, of the ethyleneoxy adducts of the corresponding fatty acid amides, or of alkylated phenols having 8 to 12 carbon atoms in the alkyl radical; sulphonic acid esters with alkyl radicals having 8 to 20 carbon atoms; sulphation products of unsaturated fats and oils; phosphoric acid esters having 8 to 20 carbon atoms; fatty acid soaps also alkylaryl sulphonates, condensation products of formaldehyde with naphthalenesulphonic acid and lignin sulphonate.

Suitable cationic dispersants are quaternary ammonium compounds that contain alkyl or aralkyl radicals having 8 to 20 carbon atoms.

In addition to the dispersants, the dyestuffs preparations can contain organic solvents, especially solvents that boil above 100° C and preferably are miscible with water, such as mono- and dialkylglycol ether, dioxane, dimethylformamide or dimethylacetamide, tetramethylenesulphone or dimethylsulphoxide. Dyestuff, dispersant and solvent can with advantage be ground with one another.

The polyester fibres are dyed from aqueous dispersion with the dyestuffs according to the invention, which are sparingly soluble in water, according to the conventional processes for polyester materials. Polyesters of aromatic polycarboxylic acids with polyhydric alcohol are dyed preferably at temperatures of over 100° C under pressure. However, the dyeing can also be carried out at the boiling point of the dyed bath in the presence of dyestuff carriers, for example phenylphenols, polychlorobenzene compounds or similar assistants, or according to the thermosol process, that is to say padding with subsequent after-treatment with the application of heat, for example thermosetting, at 180°–210° C. Cellulose 2½-acetate fibres are dyed preferably at temperatures of 80°–85° C, whereas cellulose triacetate fibres are dyed advantageously at the boiling point of the dye bath. The use of dyestuff carriers is superfluous in dyeing cellulose 1½-acetate or polyamide fibers. Dyestuffs according to the invention can also be used for printing the cited materials according to conventional methods.

The dyeings obtained according to the instant process can be subjected to an after-treatment, for example by heating with an aqueous solution of an ion-free detergent.

According to the process of the present invention, the cited compounds can also be applied by printing instead of by impregnating. To this end, a printing ink, for example, is used, which contains the finely dispersed dyestuff in addition to the usual auxiliaries used in the printing industry such as wetting agents and binders.

Furthermore, it is possible to dye, for example, synthetic fibres, such as polyesters and polyamides, in organic solvent liquors, such as a mixture of perchloroethylene and dimethylformamide or in pure perchloroethylene.

According to the process of the present invention, full dyeings and prints possessing good fastness properties are obtained, especially good fastness light, thermosetting sublimation, pleating, exhaust gas, cross-dyeing, drycleaning and chlorine, and good wet fastness properties, for example fastness to water, washing and perspiration.

It is also possible to use the new water-insoluble compounds for the spin dyeing of polyamides, polyesters and polyolefines. The polymers to be dyed are appropriately in the form of powder, grains or chips, as ready prepared spinning solution or mixed in the fused state with the dyestuff which is introduced in the dry state or in the form of a dispersion or solution in an optionally volatile solvent. After the dyestuff has been uniformly distributed in the solution or the melt of the polymer, the mixture is processed in known manner by pouring, moulding or extruding to fibres, yarns, monofilaments, films and the like.

The following Examples illustrate the invention, the parts and percentages being by weight unless otherwise stated.

EXAMPLE

3 Parts by volume of thionyl chloride are added dropwise to a suspension of 2 parts of 3-(quinazolinonyl-2')-7-aminocoumarin in 50 parts by volume of benzene and 3 parts of N-butyl-N-2-phenylethyl formamide. The reaction mixture is stirred for 2 hours at 50° C, then cooled, and the product is collected by suction filtration and washed with benzene. The residue is put into 100 parts by volume of 10% aqueous ammonia solution, thoroughly stirred, and then filtered off with suction. Recrystallisation from ethanol yields 2.3 parts of yellow crystals (m.p. 167° C) of the formula

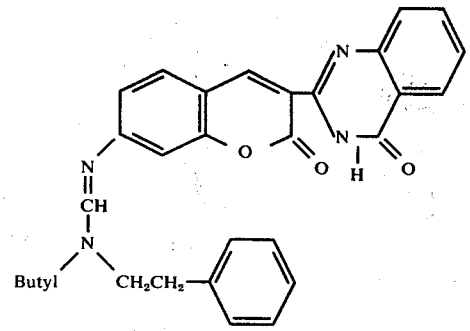

The dyestuff dyes polyester in greenish yellow shades of good fastness to light and sublimation.

The dyestuffs listed in the following Table and having the general formula

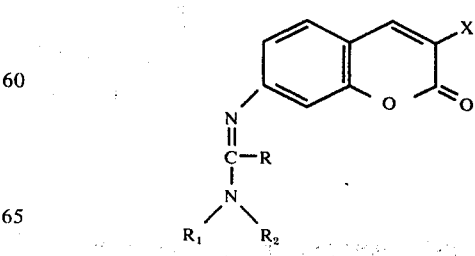

were obtained in exactly analogous manner.

| Nr. | X | R | R₁ | R₂ | Colour on polyester |
|---|---|---|---|---|---|
| 1 | 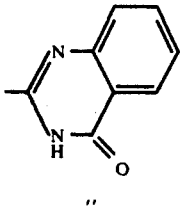 | H | CH₂CH₂CH₂CH₃ | CH₂CH₂CH₂CH₃ | greenish yellow |
| 2 | " | CH₃CH₂ | CH₂CH₂CH₂CH₃ | CH₂CH₂CH₂CH₃ | " |
| 3 | " | 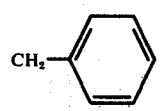 | CH₂CH₂CH₂CH₃ | CH₂CH₂CH₂CH₃ | " |
| 4 | " | CH₃CH₂ | CH₂CH₃ | CH₂CH₃ | " |
| 5 | " | 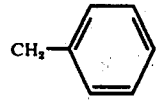 | CH₂CH₃ | CH₂CH₃ | " |
| 6 | " | H | 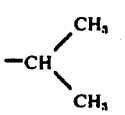 | 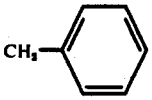 | " |
| 7 | " | H | CH₂CH₂CH₂CH₃ | 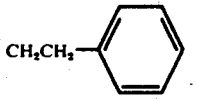 | " |
| 8 | " | H | CH₂CH₂CH₃ | 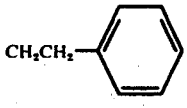 | " |
| 9 | 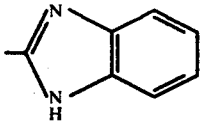 | H | CH₃ | CH₃ | " |
| 10 | " | CH₃ | CH₃ | CH₃ | " |
| 11 | " | H | CH₂CH₂CH₂CH₃ | CH₂CH₂CH₂CH₃ | " |
| 12 | " | CH₂CH₃ | CH₂CH₂CH₂CH₃ | CH₂CH₂CH₂CH₃ | " |
| 13 | " | 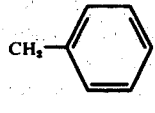 | CH₂CH₂CH₂CH₃ | CH₂CH₂CH₂CH₃ | " |
| 14 | " | CH₂CH₃ | CH₂CH₂CH₂CH₃ | CH₂CH₂CH₂CH₃ | " |
| 15 | 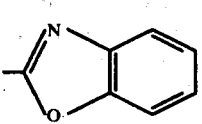 | 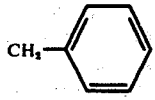 | CH₂CH₂CH₂CH₃ | CH₂CH₂CH₂CH₃ | " |
| 16 | " | H | CH₂CH₂CH₂CH₃ | CH₂CH₂CH₂CH₃ | " |
| 17 | " | H | CH₂CH₂CH₂CH₃ | 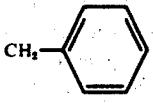 | " |
| 18 | " | H | 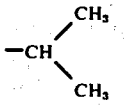 | 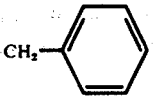 | " |

-continued

| Nr. | X | R | R₁ | R₂ | Colour on polyester |
|---|---|---|---|---|---|
| 19 | 3-methyl-quinazolin-4(3H)-one (2-yl) | CH₃ | H | phenyl | " |
| 20 | " | C₂H₅ | " | " | " |
| 21 | " | C₃H₇ | " | " | " |
| 22 | " | C₂H₅ | " | —CH₂—phenyl | " |
| 23 | benzimidazol-2-yl | CH₃ | " | phenyl | " |
| 24 | " | C₂H₅ | " | " | " |
| 25 | " | C₃H₇ | " | " | " |
| 26 | " | C₂H₅ | " | —CH₂—phenyl | " |
| 27 | benzoxazol-2-yl | CH₃ | " | phenyl | " |
| 28 | " | C₂H₅ | " | " | " |
| 29 | " | C₃H₇ | " | " | " |
| 30 | " | C₂H₅ | " | —CH₂—phenyl | " |

Dyeing Procedure 1

1 Part of the dyestuff obtained according to the Example is ground wet with 2 parts of a 50% aqueous solution of the sodium salt of dinaphthylmethane-disulphonic acid and dried.

This dyestuff preparation is stirred with 40 parts of a 10% aqueous solution of he sodium salt of N-benzyl-μ-heptadecyl-benzimidazole-disulphonic acid and 4 parts of a 40% acetic acid solution are added. A dyebath of 4000 parts by volume is prepared therefrom by dilution with water.

100 Parts of a cleansed polyester fibre material are put into this bath at 50° C, the temperature is raised within half an hour to 120° to 130° C and dyeing is carried out at this temperature for 1 hour in a sealed vessel. The material is thereafter thoroughly rinsed. A full, yellow dyeing of excellent fastness to light and sublimation is obtained.

Dyeing Procedure 2

A mixture is prepared consisting of 25 parts of the dyestuff according to the Example (which has been finely ground beforehand), 550 parts of 8% aqueous thickener from modified locust bean gum, 50 parts of a 10% solution of the sodium salt of m-nitrobenzenesulphonic acid, 10 parts of a mixture of potassium oleate and pine oil, and bulked with water to 1000 parts.

Using an impeller, the mixture is stirred until the dyestuff is fully dispersed and polyethylene terephthalate is subsequently printed with this paste. After it has been printed, th fabric is dried, steamed for 20 minutes at 1½ atmospheres (gauge pressure), rinsed with cold water over the course of 10 minutes, soaped twice hot with the addition of a small amount of hydrosulphite, rinsed cold, and dried. A fast, yellow print is obtained.

Dyeing Procedure 3

20 Parts of the dyestuff obtained according to the Example are ground with 140 parts of water that contains 40 parts of sodium dinaphthylmethane-disulphonate.

A padding liquor is prepared from 200 parts of the above dyestuff preparation, 100 parts of carboxymethyl cellulose (4% aqueous solution), and 700 parts of water, by stirring the dyestuff preparation into the previously diluted thickner using an impeller and subsequently adjusting the mixture with 80% acetic acid to pH 6. A polyester fabric is put into this liquor at 30° C, padded with a pick-up of 60%, and subsequently dried at 70°-80° C. The fabric is then heated to 210° C for 60 seconds on a tenter frame, then washed hot and thoroughly rinsed with cold water. It is dyed yellow with good fastness properties.

We claim:
1. A dyestuff of the formula

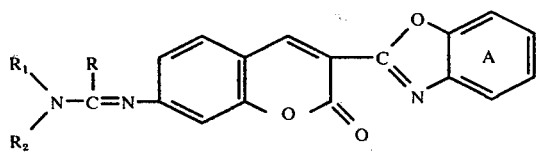

wherein
R, $R_1$ and $R_2$ are individually alkyl of 1 to 4 carbon atoms, unsubstituted or substituted by chloro, hydroxy, cyano, methoxy, acetoxy, butyryloxy, methoxycarbonyl, ethoxycarbonyl or phenyl; or are phenyl or phenyl substituted by methyl, ethyl, propyl, methoxy, ethoxy, cyano, chloro, bromo, nitro or acetylamino; and R and $R_1$ additionally represents hydrogen, or $R_1$ and $R_2$ together additionally represent, together with the nitrogen to which they are attached, the piperidine ring;

and the benzene ring A is unsubstituted or substituted by chloro; bromo; lower alkyl; lower alkoxy; acetyl; lower alkylsulphonyl; nitro or thiocyano.

2. A dyestuff according to claim 1 wherein
R, $R_1$ and $R_2$ are individually alkyl of 1 to 4 carbon atoms, unsubstituted or substituted by phenyl; or are phenyl and
R and $R_1$ additionally represent hydrogen, and the benzene ring A is unsubstituted.

3. A dyestuff as claimed in claim 1 of the formula

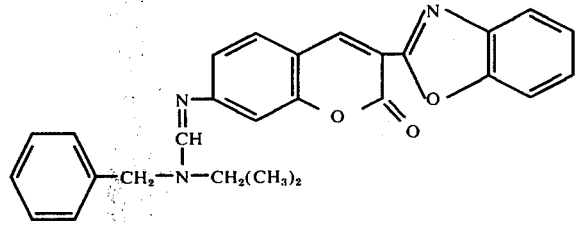

* * * * *